United States Patent [19]

Su

[11] Patent Number: 5,281,381

[45] Date of Patent: Jan. 25, 1994

[54] METHOD FOR EXTRUDING POLYOLEFINS CONTAINING VINYLIDENE CHLORIDE POLYMERS

[75] Inventor: Tien-Kuei Su, Belle Mead, N.J.

[73] Assignee: Mobil Oil Corporation, Fairfax, Va.

[21] Appl. No.: 971,119

[22] Filed: Nov. 4, 1992

[51] Int. Cl.$^5$ ............................................. B29C 47/94
[52] U.S. Cl. ..................................... 264/169; 264/130;
264/176.1; 264/171; 264/317; 264/337;
425/467
[58] Field of Search ................... 264/169, 176.1, 337,
264/39, 130, 317, 171; 425/467, 461

[56] References Cited

U.S. PATENT DOCUMENTS

| | | | |
|---|---|---|---|
| 2,403,476 | 7/1946 | Berry et al. | 18/8 |
| 3,446,884 | 5/1969 | Miller et al. | 264/209 |
| 4,264,294 | 4/1981 | Ruiz | 425/467 |
| 4,324,748 | 4/1982 | Hatakeyama et al. | 264/51 |
| 4,484,883 | 11/1984 | Honda et al. | 264/40.6 |
| 4,615,858 | 10/1986 | Su | 425/467 |
| 4,812,267 | 3/1989 | Hoffmann et al. | 425/467 |
| 4,855,404 | 8/1989 | Betso et al. | 264/337 |
| 4,948,543 | 8/1990 | Pawlowski et al. | 264/176.1 |
| 5,008,056 | 4/1991 | Kurtz et al. | 425/467 |
| 5,045,259 | 9/1991 | Berdasco et al. | 264/169 |
| 5,064,594 | 11/1991 | Priester et al. | 264/176.1 |
| 5,089,200 | 2/1992 | Chapman, Jr. et al. | 264/176.1 |

FOREIGN PATENT DOCUMENTS

| | | | |
|---|---|---|---|
| 56-95637 | 8/1981 | Japan . | |
| 58-12743 | 1/1983 | Japan | 425/461 |
| 63-212527 | 9/1988 | Japan | 425/461 |

OTHER PUBLICATIONS

*Plastics World*, Plastics Newsfront, pp. 113-114 (Sep. 1984) Ser. No. 07/971,135, filed Nov. 4, 1992 (Mobil Docket 6841); Ser. No. 07/971,120 (Mobil Docket 6843), Ser. No. 07/971,119 (Mobil Docket 6844) and Ser. No. 07/971,114 (Mobil Docket 6842), all filed Nov. 4, 1992.

*Primary Examiner*—Jeffery Thurlow
*Attorney, Agent, or Firm*—A. J. McKillop; M. D. Keen; M. V. Schneller

[57] ABSTRACT

A method for extruding polypropylene containing vinylidene chloride polymers (PVdC). According to the present invention, the polymers are extruded using extrusion equipment coated with a fluoropolymer. This method improves the processability, alleviates thermal degradation of the PvdC, improves the extrudate quality by reducing discoloration and voids in surfaces of the extruded product and protects the equipment by reducing the corrosive wear.

6 Claims, No Drawings

METHOD FOR EXTRUDING POLYOLEFINS CONTAINING VINYLIDENE CHLORIDE POLYMERS

FIELD OF THE INVENTION

The invention relates to a method for extruding polypropylene containing vinylidene chloride polymers (PVdC). According to the present invention, the polymers are extruded or coextruded using extrusion equipment coated with a fluoropolymer. Methods for applying the coating can be either by a solution of the fluoropolymer in a suitable solvent or by melt processing. This method improves the processability, alleviates thermal degradation of the PVdC, improves the extrudate quality by reducing discoloration and voids and protects the equipment by reducing the corrosive wear.

BACKGROUND OF THE INVENTION

Vinylidene chloride polymers have excellent barrier properties to a wide variety of gases and liquids due to the combination of high density and high crystallinity of the polymers. Extruded or coated PVdC products with superior resistance to most gases like oxygen are used in packaging. However, PVdC materials are subject to thermal instability. Thermal degradation by dehydrochlorination can be promoted by metals, such as zinc, copper and iron (steel).

During extrusion of polyolefins containing PVdC on conventional equipment, thermal degradation is a problem. For example, blends of polypropylene and PVdC are processed at temperatures of about 160°–165° C. and up to 220° C. Thermal degradation by dehydrochlorination of PVdC occurs at temperatures above 120° C. on conventional equipment; at temperatures about 170° C. carbon black builds up; build up of the carbon black can also result in break off of carbon which contaminates the extrudate with black specks; at 165° C. this carbon build up may result in a black extrudate. The dehydrochlorination of the PVdC is, by definition, accompanied by the evolution of hydrochloric acid. This elimination of HCl, molecular components of atoms of the PVdC, also results in holes in the extrudate.

One of the recommended ways of eliminating the problems of thermal degradation of the PVdC on extrusion is to use metals and/or alloys of other than steel or iron containing extrusion equipment, dies, screw and barrel. Dies, screw(s) and barrels made out of materials other than steel and iron eliminate the aspect of the iron (steel and/or zinc and/or copper) promoted dehydrochlorination of PVdC. However, this is a costly alternative for eliminating decomposition of the PVdC contained on the polypropylene extrudate or blended therein.

SUMMARY OF THE INVENTION

This invention describes the method of coating the dies to eliminate decomposition of the PVdC containing polypropylene extrudates. By solution coating the die, and/or barrel and/or screw of the equipment made of iron and steel (or containing zinc and/or copper), it has been found that the dehydrochlorination of the PVdC can be substantially reduced if not substantially eliminated.

The invention describes a method of solution coating the dies to eliminate the dehydrochlorination. It can be done by conventional solution coating technique, e.g. dipping, brushing, etc. The die can be coated to any desired thickness. In addition, the coated layer can be easily removed from the die by the same solvent used in its application.

DETAILED DESCRIPTION OF THE INVENTION

A solution of inert polymer is applied to the portion of the die, and/or barrel and/or screw which contacts the polypropylene containing the PVdC. As noted above, the PVdC content of the polypropylene can be as a lamina, resulting from coextrusion of the polypropylene and PVdC. Alternatively, the PVdC content of the polypropylene can be blended with the polypropylene, in blends which contain 1 to 25% polyvinylidene chloride, with the remainder being polypropylene. Coextrusion of polypropylene with polyvinylidene chloride polymers or copolymers produces products in which the polyvinylidene chloride layer comprises 1 to 25 weight percent of the composite.

A solution of inert polymer is applied to the portion of the die, and/or barrel and/or screw which contacts the polypropylene containing the PVdC. The amount of the inert polymer is sufficient to form an inpenetrable sheath between the melt which is being extruded and the extruder equipment (die and/or barrel and/or screw) formed of iron or steel (and/or copper and/or zinc).

Coating materials such as inorganic polymers or fluorine containing polymers can be used. Preferred are polyvinylidene fluoride containing polymers. Experiments below were conducted using DuPont Viton A fluoroelastomer which is based upon vinylidene fluoride. Acetone, methyl ethyl butene, tetra hydrofuran, and the like, which are polar solvents, are common solvents for Viton A. The solutions of polymer can have contents ranging from 0.25 to 10 percent polymer.

In accordance with the invention, a method of solution coating the dies to eliminate the dehydrochlorination, is described. It can be done by conventional solution coating technique, e.g. dipping, brushing etc. The die can be coated to any desired thickness. In addition, the coated layer can be easily removed from the die by solvent.

After coating the equipment surfaces with the polymer, the polymer solvent is evaporated. As a result, the coated surface is dried. The coating on the surface of the extrusion acts as a sheath through which the polypropylene containing polyvinylidene chloride is actually extruded: the coating acts as an impenetrable barrier which eliminates contact between the polyvinylidene component and the iron or steel extrusion equipment.

The molten materials in preparation for extrusion may contain commercial quantities of color and antiblocking agents. The materials may contain color and antiblocking agents ranging from 0 to 10%, percentage based on the blend. In addition to the polymeric components, the extrusion melts may contain microtalc, stabilizer, compatibilizers, pigments, and the like. The melts may be prepared using any of various methods known in the art. For example, pellets of the two polymers may be dry blended and the blend added directly to a blown film extruder, e.g., a Sterling extruder, to produce films having a thickness, for example, of about 0.5 to 5 mils. Blown film is relatively thin as compared to film or sheet used in molding operations and is generally used in flexible packaging. In this process, tubular products, for example, bags, can be produced. The tube may also be slit to form flat film. The film may also be oriented.

The following examples illustrate specific embodiments of the invention.

EXAMPLES 30 grams of Mobil's PXS film (about 77/28 polypropylene/polyvinylidene chloride) were fed into a Brabender mixer at a melt temperature of 175° C. The samples were visually examined for color and the presence of black specs as a function of compounding time. The results are shown in Table I. Those experiments included providing metal surface protection by coating with a 1% DuPont's Viton A in acetone. Protection of the conventional processing equipment with a fluoroelastomer imparts better stability of processing polypropylene containing polyvinylidiene chloride.

TABLE 1

| Sample # | Metal Protection | Time. min | Color | Black Specs |
| --- | --- | --- | --- | --- |
| A-1 | No | 1 | 2 | No |
| A-2 | No | 5 | 3 | No |
| A-3 | No | 10 | 3 | Yes |
| A-4 | No | 20 | 4 | Yes |
| A-5 | No | 30 | 4 | Yes |
| A-1 | Yes* | 1 | 1 | No |
| β-2 | Yes* | 5 | 2 | No |
| B-3 | Yes* | 10 | 2 | No |
| B-4 | Yes* | 20 | 3 | No |
| B-5 | Yes* | 30 | 3 | Yes |

Color Rating: 1 = light tan; 2 = tan; 3 = brown 4 = dark brown; 5 = black
*The metal surface was coated with a 1% Viton solution.

Next processing 60/40 of PP/PXS (about 89/11 of PP/PVdC) at 170 to 210° C. produced products which were visually examined for color; and the appearance of the cross section and the surface of the products were also examined. The results are tabulated in Table II. Again, protecting the metal surface of the processing equipment with a fluoroelastomer, improves the stability of extruding polyvinylidene containing polyvinyldiden chloride and the extrudate product.

TABLE II

| Sample # | Equipment | Temp. C. | Color | Surface | Voids in Cross Sect. |
| --- | --- | --- | --- | --- | --- |
| A-1 | 0 | 170 | 3 | rough | some |
| B-1 | 1 | 170 | 2 | smooth | none |
| A-2 | 0 | 190 | 3 | rough | some |
| B-2 | 1 | 190 | 2 | smooth | none |
| A-3 | 0 | 210 | 4 | very rough | lots |
| B-3 | 1 | 210 | 3 | smooth | none |
| B-4 | 1* | 210 | 3 | smooth | none |

Equipment 0 = No protection
Equipment 1 = The screw, barrel, and die were coated with a 1% Viton A solution
Equipment 1* = The screw, barrel, and die were conditioned by extruding 3% Viton A or Kyner 710 concentrates.

What is claimed is:

1. A process for extruding molten polyvinylidene chloride containing polypropylene, wherein said polyvinylidene chloride on contact with iron or steel at 160° to 170° C., produces hydrogen chloride, through extrusion equipment comprising a die and/or barrel and/or screw of iron or steel which promotes the dehydrochlorination of polyvinylidene chloride, comprising
providing an impenetrable inert polymeric sheath for molten polypropylene on surfaces of said equipment which contact said polyvinylidene chloride during said extruding, wherein said polymeric sheath is inert under the conditions of extrusion;
extruding said molten polypropylene containing polyvinylidene chloride through said sheath at temperatures ranging from 160° to 220° C.; and
substantially eliminating corrosion of the equipment and substantially reducing carbon build up due to decomposition of the polyvinyldiene chloride.

2. The process of claim 1, wherein said sheath is provided by forming a solution of a polymer comprising polyvinylidene fluoride in a solvent for said polymer and applying said solution to said surfaces.

3. The process of claim 1, which further includes dissolving said sheath, after extruding.

4. The process of claim 2, which further includes dissolving said sheath, after extruding.

5. The process of claim 1 wherein the polypropylene and the polyvinylidene chloride are blended.

6. The process of claim 1, wherein the polyvinylidene chloride is coextruded with the polypropylene to form a lamina thereon.

* * * * *

UNITED STATES PATENT AND TRADEMARK OFFICE
CERTIFICATE OF CORRECTION

PATENT NO. : 5,281,381
DATED : January 25, 1994
INVENTOR(S) : Tien-Kuei Su

It is certified that error appears in the above-indentified patent and that said Letters Patent is hereby corrected as shown below:

On title page, item [57] Abstract, line 6,

"PvdC" should read --PVdC--

Signed and Sealed this

Fourteenth Day of June, 1994

Attest:

BRUCE LEHMAN

*Attesting Officer*  *Commissioner of Patents and Trademarks*